United States Patent
Kanai et al.

(10) Patent No.: US 10,247,609 B2
(45) Date of Patent: Apr. 2, 2019

(54) SPECTROMETRY DEVICE, IMAGE FORMING APPARATUS, AND SPECTROMETRY METHOD

(71) Applicant: Seiko Epson Corporation, Tokyo (JP)

(72) Inventors: Masashi Kanai, Azumino (JP); Naoki Kuwata, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/076,961

(22) Filed: Mar. 22, 2016

(65) Prior Publication Data

US 2016/0282183 A1    Sep. 29, 2016

(30) Foreign Application Priority Data

Mar. 23, 2015   (JP) ................. 2015-059382

(51) Int. Cl.
| | | |
|---|---|---|
| *G01J 3/28* | (2006.01) | |
| *G01J 3/02* | (2006.01) | |
| *G01J 3/10* | (2006.01) | |
| *G01J 3/50* | (2006.01) | |
| *H05B 37/02* | (2006.01) | |
| *G01J 1/42* | (2006.01) | |
| *G01J 3/26* | (2006.01) | |

(Continued)

(52) U.S. Cl.
CPC ............. *G01J 3/28* (2013.01); *G01J 1/4204* (2013.01); *G01J 3/027* (2013.01); *G01J 3/10* (2013.01); *G01J 3/26* (2013.01); *G01J 3/50* (2013.01); *G01J 3/524* (2013.01); *H04N 1/6086* (2013.01); *H05B 37/0218* (2013.01); *G01J 2003/2879* (2013.01)

(58) Field of Classification Search
CPC ..................................... G01J 3/28; G01J 3/26
See application file for complete search history.

(56) References Cited

U.S. PATENT DOCUMENTS

| | | | |
|---|---|---|---|
| 3,245,305 A | 4/1966 | Turner | |
| 5,926,318 A * | 7/1999 | Hebert | ................ G02B 27/017 345/8 |

(Continued)

FOREIGN PATENT DOCUMENTS

| | | |
|---|---|---|
| JP | H05-203495 A | 8/1993 |
| JP | 06-026844 A | 2/1994 |

(Continued)

OTHER PUBLICATIONS

Extended European Search Report for Application No. EP 16 16 1603 dated Aug. 25, 2016 (7 pages).

*Primary Examiner* — Violeta A Prieto
(74) *Attorney, Agent, or Firm* — Harness, Dickey & Pierce, P.L.C.

(57) ABSTRACT

A spectrometry device includes a spectroscope, an extraneous light sensor, and a light intensity controller. The spectroscope includes a light source that emits illumination light to a medium and a wavelength-selective interference filter that performs spectroscopy on light incident from the medium. The extraneous light sensor detects the intensity of extraneous light which is incident on the medium. The light intensity controller controls the intensity of the illumination light emitted from the light source such that the light intensity ratio of the illumination light and the extraneous light is equal to a first value.

9 Claims, 7 Drawing Sheets

(51) Int. Cl.
*G01J 3/52* (2006.01)
*H04N 1/60* (2006.01)

(56) References Cited

U.S. PATENT DOCUMENTS

| | | | |
|---|---|---|---|
| 6,219,186 B1* | 4/2001 | Hebert | G02B 27/017 |
| | | | 348/46 |
| 8,807,696 B2 | 8/2014 | Eiyama | |
| 2005/0041248 A1* | 2/2005 | Imura | G01J 3/28 |
| | | | 356/328 |
| 2011/0019192 A1 | 1/2011 | Imura | |
| 2011/0255090 A1* | 10/2011 | Harada | G01J 3/02 |
| | | | 356/432 |
| 2012/0133948 A1* | 5/2012 | Funamoto | G01J 3/0205 |
| | | | 356/451 |
| 2013/0107260 A1 | 5/2013 | Nozawa | |
| 2014/0240711 A1 | 8/2014 | Matsushita | |
| 2015/0300816 A1* | 10/2015 | Yang | G01B 11/2513 |
| | | | 600/424 |
| 2015/0355024 A1* | 12/2015 | Goldring | G01N 21/255 |
| | | | 356/451 |

FOREIGN PATENT DOCUMENTS

| | | |
|---|---|---|
| JP | 2004-150873 A | 5/2004 |
| JP | 2010-210456 A | 9/2010 |
| JP | 2011-073275 A | 4/2011 |
| JP | 2013-228382 A | 11/2013 |

\* cited by examiner

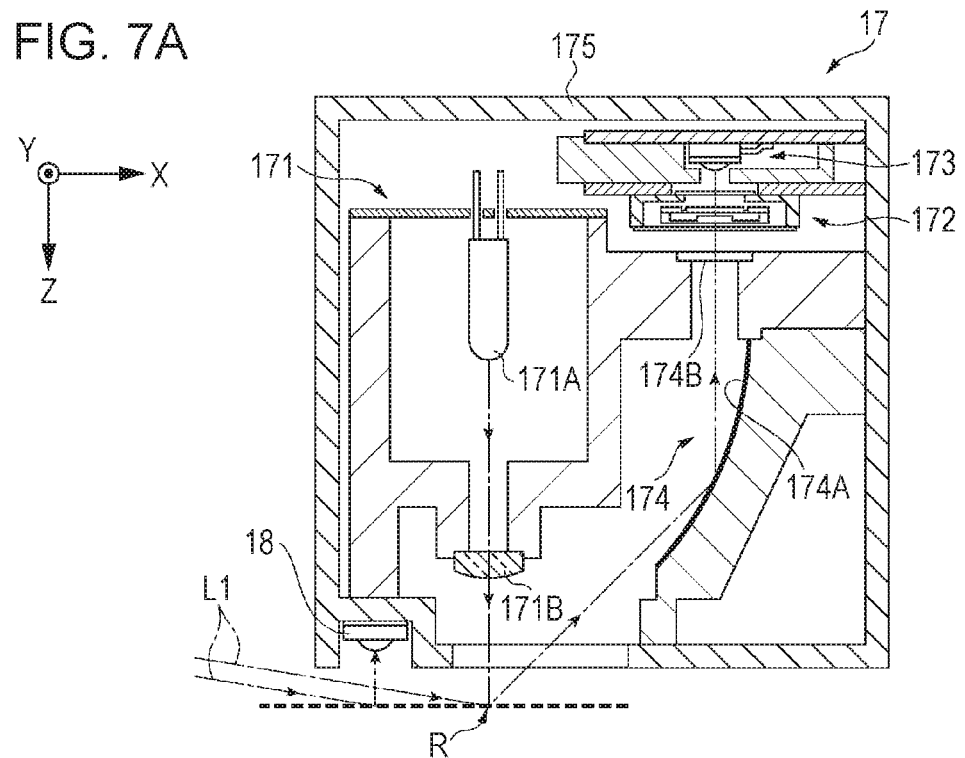
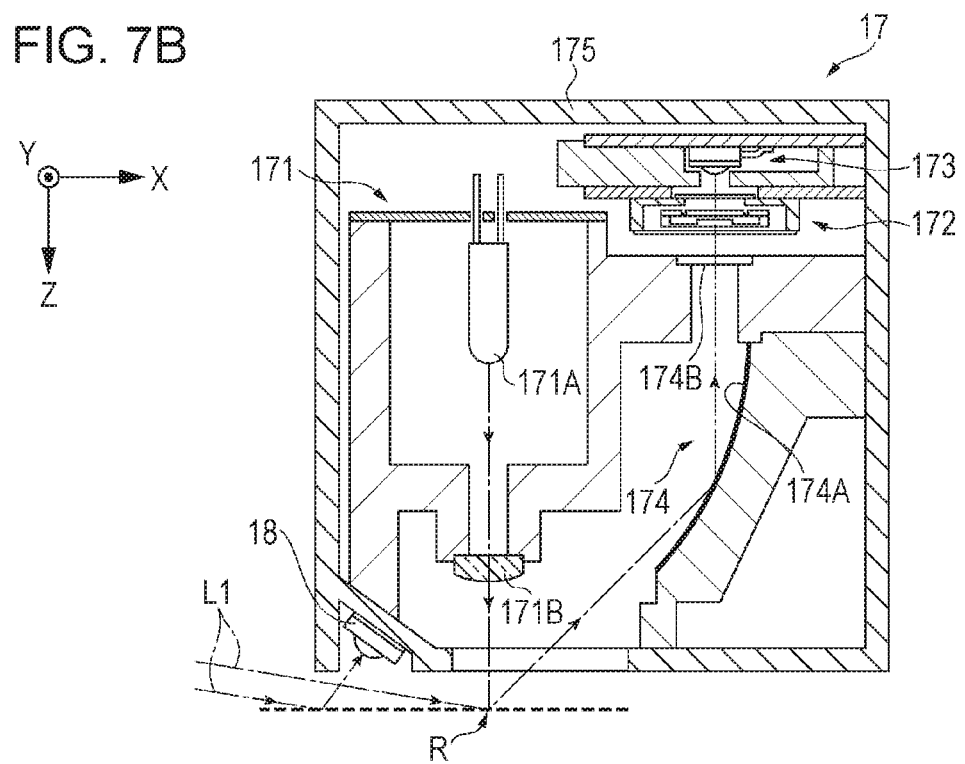

SPECTROMETRY DEVICE, IMAGE FORMING APPARATUS, AND SPECTROMETRY METHOD

BACKGROUND

1. Technical Field

The present disclosure relates to a spectrometry device, an image forming apparatus, and a spectrometry method.

2. Related Art

In the related art, an image forming apparatus such as a color printer, may include a device that measures the color of a color image (e.g., color patch or the like) formed by the image forming apparatus and provides feedback of a color measurement result to the image forming apparatus to form the color image desired by a user with high accuracy. For example, refer to JP-A-2010-210456.

The device disclosed in JP-A-2010-210456 performs a colorimetry process by irradiating a measurement target with light from a light source and causing light reflected by the measurement target to be incident on a colorimeter. At this time, the colorimeter is mounted on a printer head that forms an image on the medium, and scanning with the printer head can measure the color of the color image on the medium with a simple configuration.

Extraneous light other than illumination light from the light source may be incident on a measured object when the color of the measurement target is measured. In such a case, a problem arises in that mixing of the extraneous light components causes measurement error.

It is considered that a calibration process that performs spectrometry on a reference object, such as a white reference plate, to obtain the total intensity of extraneous light and illumination light incident on the reference object is performed before measuring the measured object. Then, the colorimetry process is performed on the measured object by using the total intensity of light and a measured value at the time of performing spectrometry on the measured object. However, the intensity of extraneous light may be changed by, for example, turning on and off an indoor illumination, passage of time, or a person standing in front of the image forming apparatus. Therefore, for example, when spectrometry is performed on a plurality of measured objects, the total intensity of light incident on the measured objects may have a different value in each spectrometry. It is considered that the calibration process is performed each time each spectrometry is performed, in which case the problem posed is that the amount of time related to measurement is increased.

SUMMARY

An advantage of some aspects of the present disclosure is to provide a spectrometry device, an image forming apparatus, and a spectrometry method capable of suppressing a decrease in measurement accuracy due to the intensity of extraneous light and performing high speed spectrometry.

According to an application example of the present disclosure, there is provided a spectrometry device including a spectroscope, an extraneous light detector, and a light intensity control unit. The spectroscope includes a light source that emits illumination light to a measurement target and a spectroscopy element that performs spectroscopy on incident light from the measurement target. The extraneous light detector detects the intensity of extraneous light, and the light intensity control unit controls the intensity of the illumination light so that the light intensity ratio of the illumination light and the extraneous light is equal to a first value.

In the application example, the light intensity control unit controls the intensity of the illumination light emitted from the light source so that the light intensity ratio of the extraneous light and the illumination light is equal to the first value. That is, if the intensity of the extraneous light is increased, so is the intensity of the illumination light from the light source increased in response.

In such a spectrometry device, the light intensity ratio of the extraneous light and the illumination light with which the measurement target is irradiated is constant at all times. Thus, if a spectrometry result is corrected based on the light intensity ratio, spectrometry can be performed with high accuracy by suppressing influence from a change in the intensity of the extraneous light. In addition, the calibration reference object is not required to be measured each time the intensity of the extraneous light changes, and high speed spectrometry can be performed.

In the spectrometry device of the application example, the light intensity control unit sets the first value to the light intensity ratio of the extraneous light and the illumination light when spectrometry is performed on a calibration reference object as the measurement target by using the spectroscope.

In the application example, the first value is set to the ratio of the intensity of the extraneous light (first extraneous light intensity) and the intensity of the illumination light (first illumination light intensity) when spectrometry is performed on the calibration reference object. In addition, the light source is so adjusted that the light intensity ratio is equal to the first value when spectrometry is performed on a subsequent arbitrary measured object. Accordingly, even if, the environment around, for example, a location where the spectrometry device is installed is significantly changed, the light source can be controlled according to the environment so that the light intensity ratio of the extraneous light and the illumination light is constant.

The intensity of the extraneous light is significantly different when, for example, natural light (sunlight) is incident as the extraneous light and when light of a dim fluorescent lamp is incident as the extraneous light in a room or the like. When the intensity of the illumination light from the light source is adjusted to the preset first value in such cases, the light intensity ratio may not be equal to the first value even if the intensity of the illumination light from the light source is set to a minimum value, or the light intensity ratio may not be equal to the first value even if the intensity of the illumination light is set to a maximum value. Regarding this matter, the intensity of the illumination light from the light source is adjusted based on the optimum first value according to the surrounding environment in the application example. Thus, such a problem described above does not arise, and spectrometry can be performed appropriately.

The spectrometry device of the application example may further include a reflectance calculator that calculates the reflectance of a measured object based on a first measured value when spectrometry is performed on the calibration reference object as the measurement target by using the spectroscope, a second measured value when spectrometry is performed on the measured object as the measurement target by using the spectroscope, a first light intensity value that is based on the intensity of one of the illumination light and the extraneous light during spectrometry performed on the calibration reference object, and a second light intensity value that is based on the intensity of the other of the illumination light and the extraneous light during spectrometry performed on the measured object.

The first light intensity value and the second light intensity value are exemplified by, for example, an output signal value that corresponds to the intensity of the extraneous light output from the extraneous light detector, an intensity value of the extraneous light that is calculated according to the output signal value, an intensity value of the illumination light emitted from the light source, and a drive signal for driving the light source.

In the application example, the reflectance calculator corrects a result of second measurement obtained by performing spectrometry on an arbitrary measured object, based on a result of first measurement and the first light intensity value obtained by performing spectrometry on the calibration reference object and the second light intensity value when spectrometry is performed on an arbitrary measured object.

Generally, a reflectance is a value resulting from dividing the second measured value by the first measured value. However, measurement error may occur if the total intensity of light incident on the measurement target is changed during calibration and during measurement. Regarding this matter, as described above, the light source is controlled so that the light intensity ratio of the extraneous light and the illumination light is constant in the application example. Thus, even if the total intensity of light of the spectral wavelength is changed during calibration and during measurement, the rate of change of the light intensity can be calculated provided that the first light intensity value in the calibration and the second light intensity value in the measurement are determined. Therefore, the second measured value can be easily corrected according to the rate of change of the light intensity, and high accuracy spectrometry can be performed even if the intensity of the extraneous light is changed.

In the spectrometry device of the application example, the spectroscopy element is a wavelength-selective Fabry-Perot etalon element.

In the application example, a wavelength-selective Fabry-Perot etalon element is used as the spectroscopy element. Such an etalon element has a low cost and small size in comparison with a case where other spectroscopy elements such as an acousto-optic tunable filter (AOTF) and a liquid crystal tunable filter (LCTF) are used. Thus, the cost and size of the spectrometry device are decreased. In addition, since the spectral wavelength can be changed, spectrometry can be easily performed by a simple configuration on, for example, light of a plurality of wavelengths in a predetermined measurement target wavelength region.

According to another application example of the present disclosure, there is provided an image forming apparatus including the spectrometry device, and an image forming unit that forms an image on an image formation target.

In the application example, a reference color image such as a color patch is formed by the image forming unit on the image formation target, and then, high accuracy spectrometry can be performed by the spectrometry device on the reference color image formed. Thus, it is possible to determine with high accuracy whether the color of the reference color image formed is the same as the color that the image forming unit is commanded to form, and, if the colors are different, feedback can be provided to the image forming unit according to a spectrometry result.

According to still another application example of the present disclosure, there is provided a spectrometry method for a spectrometry device that includes a spectroscope and an extraneous light detector. The spectroscope includes a light source that emits illumination light to a measurement target and a spectroscopy element that performs spectroscopy on incident light from the measurement target. The extraneous light detector detects the intensity of extraneous light which is incident on the measurement target. The method includes light intensity controlling that controls the intensity of the illumination light so that the light intensity ratio of the illumination light and the extraneous light is equal to a first value.

In the application example, the light intensity controlling that controls the intensity of the illumination light emitted from the light source so that the light intensity ratio of the illumination light and the extraneous light is equal to the first value (constant) is performed in the spectrometry method using the spectrometry device. Therefore, as in the above application example, a measurement result from spectrometry can be easily corrected by the intensity of either the illumination light or the extraneous light, and spectrometry can be performed with high accuracy by suppressing influence from a change in the intensity of the extraneous light. In addition, the calibration reference object is not required to be measured each time the intensity of the extraneous light changes, and high speed spectrometry can be performed.

The spectrometry method of the application example further includes first measuring that performs spectrometry on a calibration reference object as the measurement target by using the spectroscope and obtains a first measured value, second measuring that performs spectrometry on a measured object as the measurement target by using the spectroscope and obtains a second measured value, and correcting that corrects the second measured value based on a first light intensity value that is based on the intensity of one of the extraneous light and the illumination light in the first measuring, a second light intensity value that is based on the intensity of the other of the extraneous light and the illumination light in the second measuring, and the first measured value, in which each of the first measuring and the second measuring includes the light intensity controlling.

In the application example, as in the above application example, the second measured value is corrected based on the first measured value, the first light intensity value, and the second light intensity value by performing the first measuring, the second measuring, and the correcting.

Therefore, in the application example, even if the total intensity of light of the spectral wavelength is changed during calibration and during measurement, the rate of change of the light intensity can be calculated provided that the intensity of the extraneous light (or the intensity of the illumination light) during each of the calibration and the measurement is determined, and the second measured value can be easily and accurately corrected according to the rate of change of the light intensity.

BRIEF DESCRIPTION OF THE DRAWINGS

The present disclosure will be described with reference to the accompanying drawings, wherein like numbers reference like elements.

FIGS. 7A and 7B are diagrams illustrating a position of an extraneous light sensor in a modification example of the spectroscope.

DESCRIPTION OF EXEMPLARY EMBODIMENTS

Hereinafter, one embodiment according to the present disclosure will be described based on the drawings. In the present embodiment, hereinafter, a printer 10 (ink jet printer) that includes a spectrometry device will be described as an example of an image forming apparatus of the present disclosure.

Schematic Configuration of Printer

Figure 1:
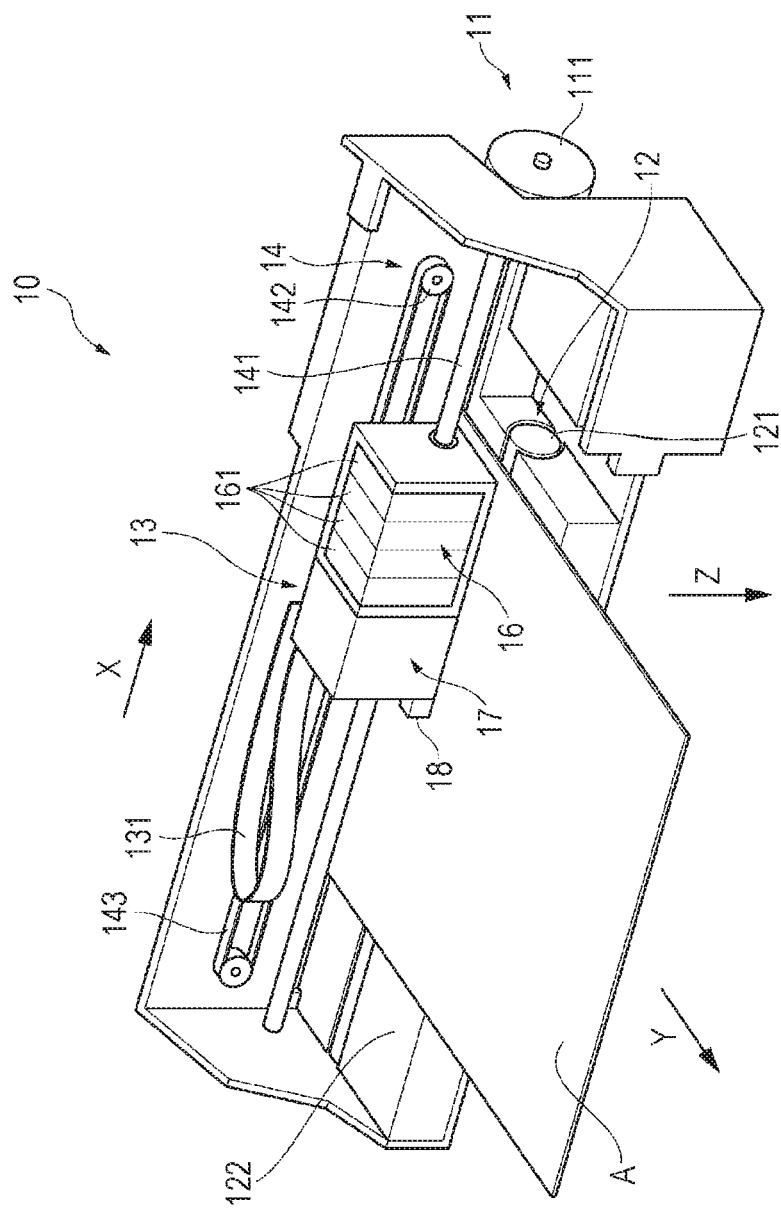
FIG. 1 is a perspective view illustrating an exterior configuration of a printer of a first embodiment of the present disclosure.
Figure 2:
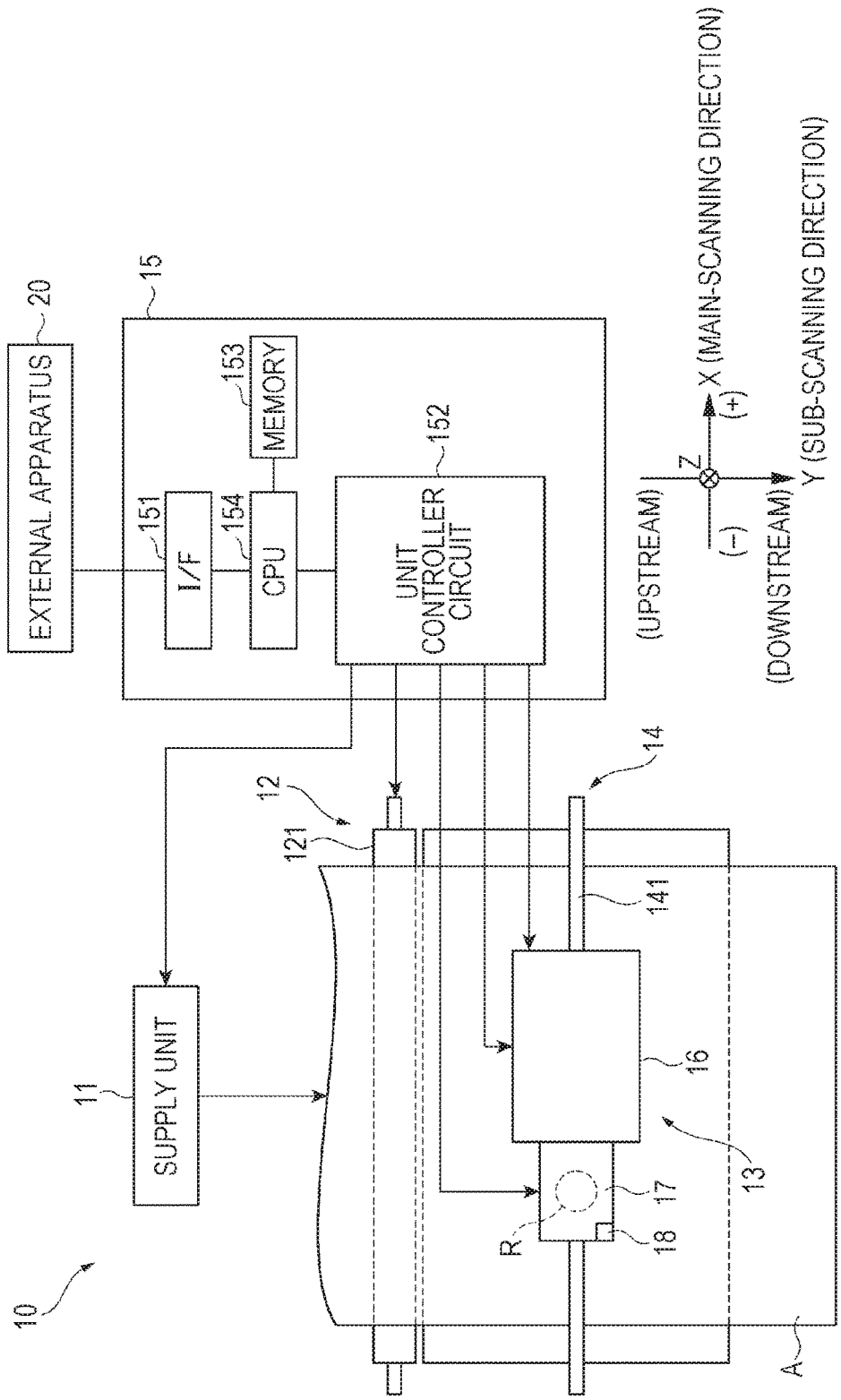
FIG. 2 is a block diagram illustrating a schematic configuration of the printer of the first embodiment.

FIG. 1 is a diagram illustrating an exterior configuration example of the printer 10. FIG. 2 is a block diagram illustrating a schematic configuration of the printer 10 of the present embodiment.

As illustrated in FIG. 1, the printer 10 includes a supply unit 11, a transport unit 12, a carriage 13, a carriage moving unit 14, and a control unit 15 (refer to FIG. 2). The printer 10 controls each of the units 11, 12, 14, and the carriage 13 based on print data that is input from an external apparatus 20, such as a personal computer, and prints an image on a medium A (i.e., measurement target and image formation target). In addition, the printer 10 of the present embodiment forms a measurement color patch at a predetermined position on the medium A based on preset calibration print data and performs spectrometry on the color patch. Accordingly, the printer 10 determines whether a color shift is present in the printed color by comparing an actual measured value from the color patch with the calibration print data and, if a color shift is present, corrects color based on the actual measured value.

Hereinafter, each configuration of the printer 10 will be specifically described.

The supply unit 11 supplies the image formation target medium A (illustrated as paper in the present embodiment) to the position of image formation. The supply unit 11 includes, for example, a roll body 111 (refer to FIG. 1) on which the medium A is wound, a roll drive motor (not illustrated), and a roll drive wheel array (not illustrated). The roll drive motor is rotationally driven based on a command from the control unit 15, and the torque of the roll drive motor is transmitted to the roll body 111 through the roll drive wheel array. Accordingly, the roll body 111 rotates and supplies the paper wound on the roll body 111 to the downstream side (+Y direction) in a Y direction (sub-scanning direction).

While the present embodiment illustrates supply of paper that is wound on the roll body 111, this illustration is not for limitation purposes. The medium A may be supplied in any method, such as supplying paper stacked (i.e., medium A) in a tray one sheet at a time by a roller or the like.

The transport unit 12 transports the medium A supplied from the supply unit 11 along the Y direction. The transport unit 12 is configured to include a transport roller 121, a driven roller (not illustrated) and a platen 122. The driven roller is arranged to interpose the medium A between the transport roller 121 and the driven roller and is driven by the transport roller 121.

Drive force is transmitted to the transport roller 121 from a transport motor (not illustrated). When the transport motor is driven by control of the control unit 15, the transport roller 121 is rotationally driven by the torque of the transport motor and transports, along the Y direction, the medium A that is interposed between the transport roller 121 and the driven roller. The platen 122 that faces the carriage 13 is disposed on the downstream side (+Y side) of the transport roller 121 in the Y direction.

The carriage 13 includes a printing unit 16 that prints an image on the medium A, a spectroscope 17 that performs spectrometry at a predetermined position of measurement (in a range of measurement) on the medium A, and an extraneous light sensor 18 that measures the intensity of extraneous light.

The carriage 13 is disposed to be movable by the carriage moving unit 14 along a main-scanning direction (X direction) that intersects with the Y direction.

The carriage 13 is connected to the control unit 15 by a flexible circuit 131 and performs a printing process (process of forming an image on the medium A) with the printing unit 16 and a light intensity measuring process with the spectroscope 17 based on a command from the control unit 15.

A detailed configuration of the carriage 13 will be described later.

The carriage moving unit 14 constitutes a moving unit of the present disclosure and causes the carriage 13 to reciprocate along the X direction based on a command from the control unit 15.

The carriage moving unit 14, for example, is configured to include a carriage guide shaft 141, a carriage motor 142, and a timing belt 143.

The carriage guide shaft 141 is arranged along the X direction and has both end portions fixed to, for example, the casing of the printer 10. The carriage motor 142 drives the timing belt 143. The timing belt 143 is supported approximately parallel to the carriage guide shaft 141, and a part of the carriage 13 is fixed thereto. When the carriage motor 142 is driven based on a command of the control unit 15, the timing belt 143 travels in normal (i.e., forward) and reverse directions, and the carriage 13 fixed to the timing belt 143 reciprocates while being guided by the carriage guide shaft 141.

Next, a configuration of the printing unit 16, the spectroscope 17, and the extraneous light sensor 18 disposed in the carriage 13 will be described.

Configuration of Printing Unit (Image Forming Unit)

The printing unit 16 is an image forming unit of the present disclosure and forms an image on the medium A by discharging ink separately onto the medium A from the part facing the medium A.

Ink cartridges 161 that correspond to ink of a plurality of colors are mounted on the printing unit 16 in an attachable and detachable manner, and ink is supplied from each ink cartridge 161 to an ink tank (not illustrated) through a tube (not illustrated). In addition, nozzles (not illustrated) that discharge ink drops are disposed on the lower face of the printing unit 16 (i.e., at a position facing the medium A) in correspondence with each color. A piezoelectric element, for example, is arranged in each of these nozzles. Driving the piezoelectric element causes an ink drop supplied from the ink tank to be discharged and hit the medium A, and a dot is formed.

Configuration of Spectroscope

Figure 3:
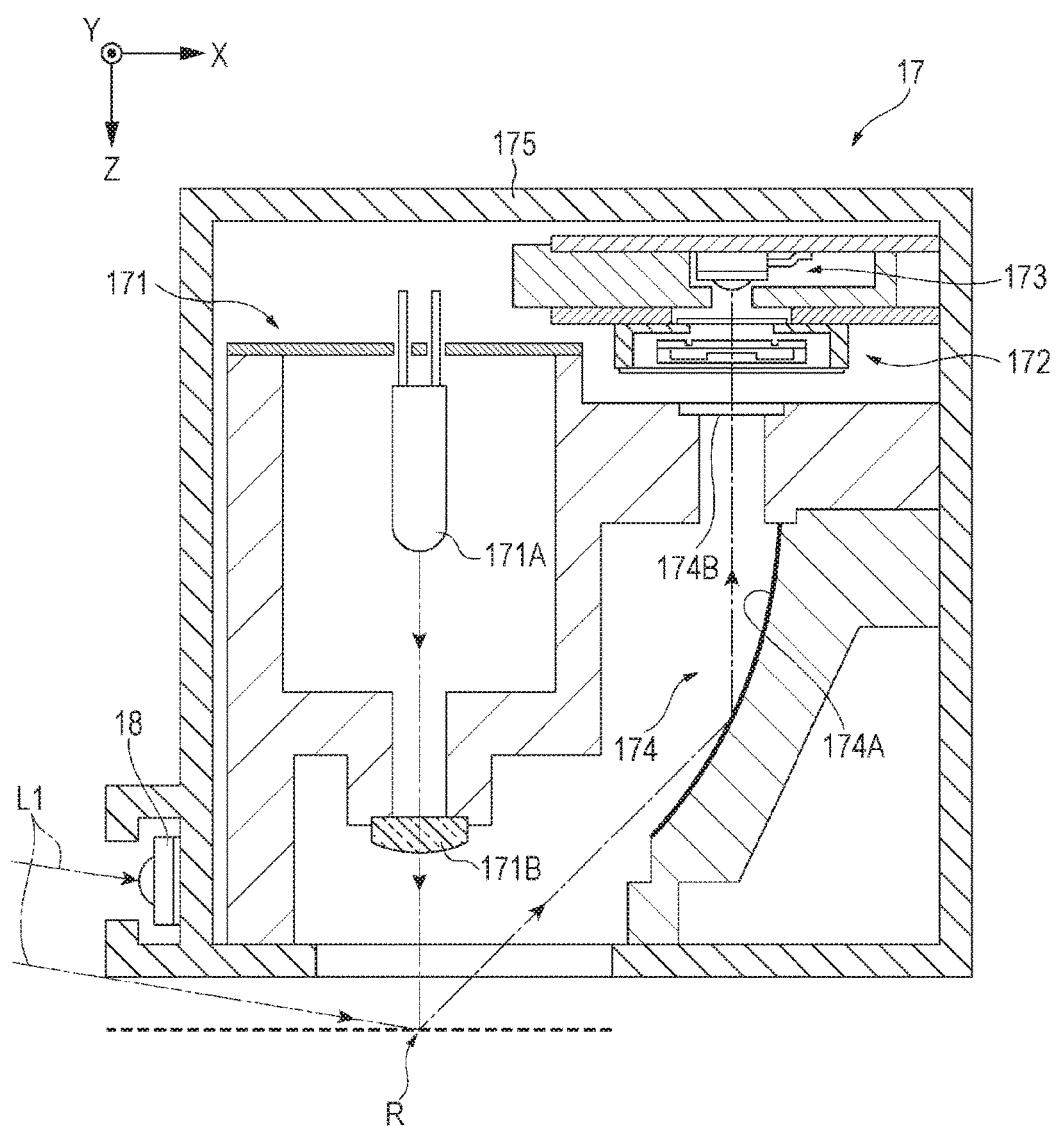
FIG. 3 is a schematic diagram of a spectroscope of the first embodiment.

FIG. 3 is a sectional view illustrating a schematic configuration of the spectroscope 17.

The spectroscope 17 includes a light source unit 171, a spectroscopy device 172, a light receiver 173, and a light guide 174 as illustrated in FIG. 3.

The spectroscope 17 irradiates the medium A with illumination light from the light source unit 171 and causes light reflected by the medium A to be incident on the spectroscopy device 172 with the light guide 174. Light of a predetermined wavelength is emitted (transmitted) by the spectroscopy device 172 from the reflected light and is received by the light receiver 173. The spectroscopy device 172 can select a transmitted wavelength based on control of the control unit 15 and can perform spectrometry at a position of measurement R on the medium A by measuring the intensity of light of each wavelength in visible light.

Configuration of Light Source Unit

The light source unit 171 includes a light source 171A and a condenser 171B. The light source unit 171 irradiates the position of measurement R with illumination light emitted from the light source 171A in the direction of the normal line of the surface of the medium A.

As the light source 171A, it is preferable to use a light source that can emit light of each wavelength in the visible light region. Such a light source 171A can be illustrated by, for example, a halogen lamp, a xenon lamp, or a white LED. The intensity of the illumination light of the light source 171A for irradiation is configured to be changeable by changing a drive voltage under control of the control unit 15.

The condenser 171B is configured of, for example, a condenser lens and condenses light from the light source 171A at the position of measurement R. While only one condenser lens is illustrated in the condenser 171B in FIG. 3, the condenser 171B may be configured by combining a plurality of lenses.

Configuration of Spectroscopy Device

Figure 4:
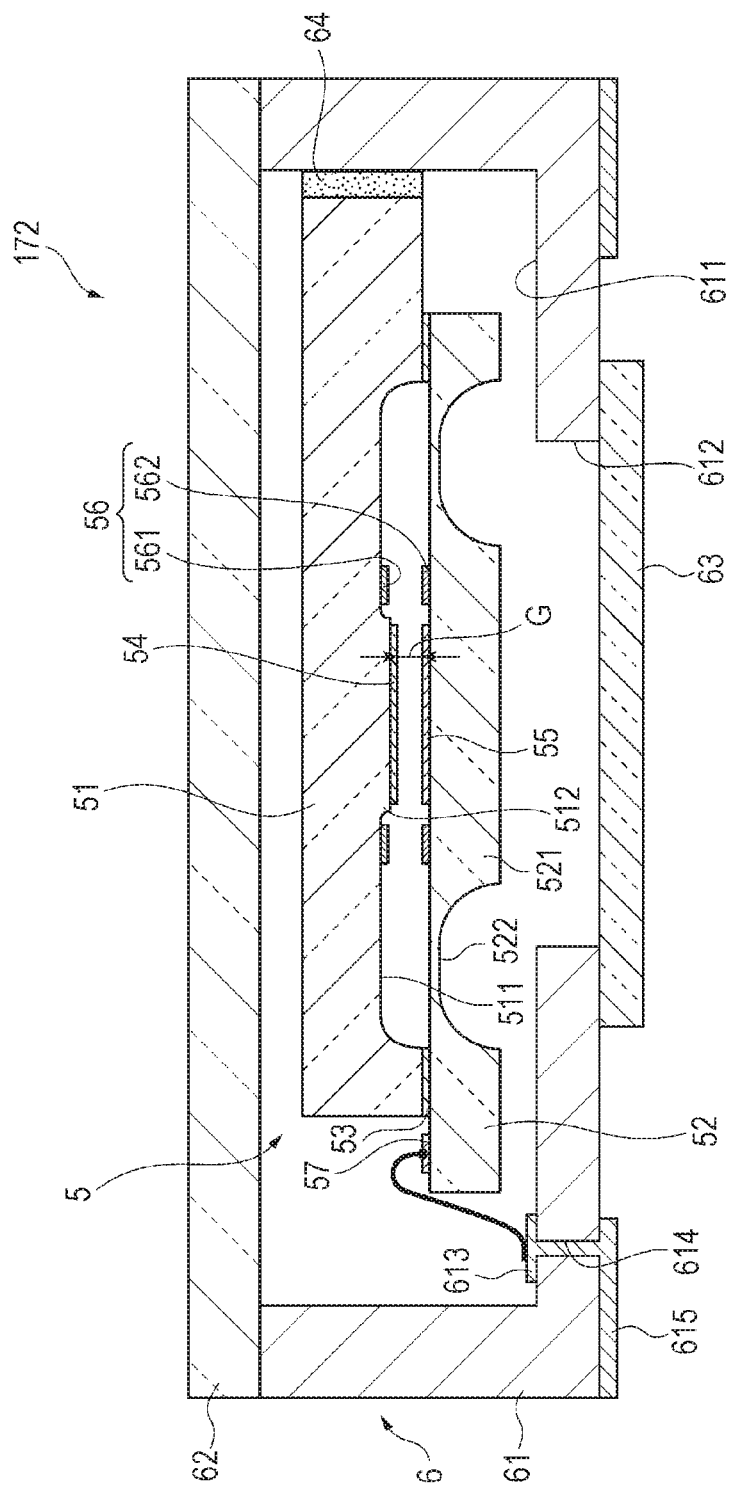
FIG. 4 is a sectional view of a spectroscopy device that includes a wavelength-selective interference filter (spectroscopy element) of the first embodiment.

FIG. 4 is a sectional view illustrating a schematic configuration of the spectroscopy device 172.

The spectroscopy device 172 includes a casing 6 and a wavelength-selective interference filter 5 (spectroscopy element) that is accommodated in the casing 6.

Configuration of Wavelength-Selective Interference Filter

The wavelength-selective interference filter 5 is a wavelength-selective Fabry-Perot etalon element and constitutes a spectroscopy element of the present disclosure. While the present embodiment illustrates the wavelength-selective interference filter 5 as being arranged in the spectroscope 17 while being accommodated in the casing 6, the wavelength-selective interference filter 5 may be, for example, configured to be directly arranged in the spectroscope 17.

The wavelength-selective interference filter 5 includes a light-transmissive fixed substrate 51 and a light-transmissive movable substrate 52 as illustrated in FIG. 4. The fixed substrate 51 and the movable substrate 52 are integrally configured by bonding with a bonding film 53. In the fixed substrate 51, disposed are a first groove portion 511 formed by etching and a second groove portion 512 having a smaller depth than the first groove portion 511. A fixed electrode 561 and a fixed reflecting film 54 are respectively disposed in the first groove portion 511 and in the second groove portion 512. The fixed reflecting film 54 is configured, for example, of a metal film made of Ag or the like, an alloy film made of an Ag alloy or the like, a dielectric multilayer film made of a laminate of a high-refractive layer and a low-refractive layer, or a laminated body made of a laminate of a metal film (alloy film) and a dielectric multilayer film.

The movable substrate 52 includes a movable portion 521 and a holding portion 522 that is disposed outside of the movable portion 521 to hold the movable portion 521. Positioned on the face of the movable portion 521 facing the fixed substrate 51 are a movable electrode 562 facing the fixed electrode 561 and a movable reflecting film 55 facing the fixed reflecting film 54. As the movable reflecting film 55, a reflecting film having the same configuration as the fixed reflecting film 54 is used. The holding portion 522 is a diaphragm that surrounds the movable portion 521 and is formed to have a smaller thickness dimension than the movable portion 521.

The fixed electrode 561 and the movable electrode 562 constitute an electrostatic actuator 56 in the wavelength-selective interference filter 5. Applying a voltage to the electrostatic actuator 56 can change the dimension of a gap G between the fixed reflecting film 54 and the movable reflecting film 55. Positioned in the peripheral portion of the movable substrate 52 (i.e., region not facing the fixed substrate 51) is a plurality of electrode pads 57 that is individually connected to the fixed electrode 561 and to the movable electrode 562.

Configuration of Casing

The casing 6 includes a base 61 and a glass substrate 62, as illustrated in FIG. 4. The base 61 and the glass substrate 62 are bonded by, for example, low melting point glass bonding to form an accommodative space therein, and the wavelength-selective interference filter 5 is accommodated in the accommodative space.

The base 61 is configured of, for example, a laminate of thin ceramic plates and includes a recessed portion 611 that can accommodate the wavelength-selective interference filter 5. The wavelength-selective interference filter 5 is fixed to, for example, a side face of the recessed portion 611 of the base 61 by a fixing material 64. A light pass hole 612 is disposed on the bottom face of the recessed portion 611 of the base 61, and a cover glass 63 is bonded to the bottom face cover the light pass hole 612.

An inside terminal unit 613 is disposed in the base and is connected to the electrode pad 57 of the wavelength-selective interference filter 5. The inside terminal unit 613 is connected through a conductive hole 614 to an outside terminal unit 615 that is disposed outside of the base 61. The outside terminal unit 615 is electrically connected to the control unit 15.

Configuration of Light Receiver and Light Guiding Optical System

Returning to FIG. 3, the light receiver 173 is arranged on the optical axis of the wavelength-selective interference filter 5 and receives light that is transmitted through the wavelength-selective interference filter 5. The light receiver 173 outputs a detection signal (current value) corresponding to the intensity of received light based on control of the control unit 15. The detection signal output by the light receiver 173 is input into the control unit 15 through an I-V converter (not illustrated), an amplifier (not illustrated), and an AD converter (not illustrated).

The light guide 174 includes a reflecting mirror 174A and a bandpass filter 174B.

The light guide 174 reflects light that is reflected at the position of measurement R on the surface of the medium A at 45° onto the optical axis of the wavelength-selective interference filter 5 with the reflecting mirror 174A. The bandpass filter 174B transmits light in the visible light region (for example, 380 nm to 720 nm) and cuts ultraviolet light and infrared light. Accordingly, light in the visible light region is incident on the wavelength-selective interference filter 5, and the light receiver 173 receives light of a wavelength in the visible light region selected by the wavelength-selective interference filter 5.

Configuration of Extraneous Light Sensor

The extraneous light sensor 18 is an extraneous light detector of the present disclosure and is disposed in the carriage 13 along with the printing unit 16 and the spectroscope 17 to measure the intensity of extraneous light.

The extraneous light sensor 18, for example, is disposed in the platen 122 side end portion of a spectroscope casing 175 of the spectroscope 17 as illustrated in FIG. 3. An optical axis L1 of the extraneous light sensor 18 is approximately parallel to the surface of the medium A (approximately parallel to the XY plane). The extraneous light sensor 18 is arranged such that extraneous light is incident in a direction on the opposite side of the extraneous light sensor 18 from the position of measurement R. In other words, the extraneous light passes or is incident on the extraneous light sensor 18 before it passes or is incident on the position of measurement R. Accordingly, the illumination light from the light source unit 171 may not be incident on the extraneous light sensor 18, and extraneous light that is incident near the position of measurement R of the medium A can be measured. The optical axis of the extraneous light sensor 18 may be arranged to be slanted slightly upward (for example, in the upper left direction in FIG. 3). In this case, incidence of extraneous light reflected by the medium A can be further prevented.

Configuration of Control Unit

As illustrated in FIG. 2, the control unit 15 is configured to include an I/F 151, a unit controller circuit 152, a memory 153, and a central processing unit (CPU) 154.

The I/F 151 inputs into the CPU 154 the print data that is input from the external apparatus 20.

The unit controller circuit 152 includes a controller circuit that controls each of the supply unit 11, the transport unit 12, the printing unit 16, the light source 171A, the wavelength-selective interference filter 5, the light receiver 173, the extraneous light sensor 18, and the carriage moving unit 14 and controls operation of each unit based on a command signal from the CPU 154. It is also possible that a controller circuit of each unit is disposed separately from the control unit 15 and is connected to the control unit 15.

The memory 153 stores various programs and various data that control operation of the printer 10.

For example, the memory 153 may store V-λ data that represents the wavelength of light transmitted through the wavelength-selective interference filter 5 with respect to the voltage applied to the electrostatic actuator 56 when the wavelength-selective interference filter 5 is controlled and printing profile data that stores the amount of each ink to be discharged with respect to color data which is included as the print data.

In addition, the memory 153 stores light source control data in which the intensity of the illumination light from the light source 171A (illumination light intensity) with respect to a light source current applied to the light source 171A is recorded.

Furthermore, the memory 153 may store light emitting characteristics of the light source 171A with respect to each wavelength, light receiving characteristics (light reception sensitivity characteristics) of the light receiver 173 with respect to each wavelength, and the like.

Figure 5:
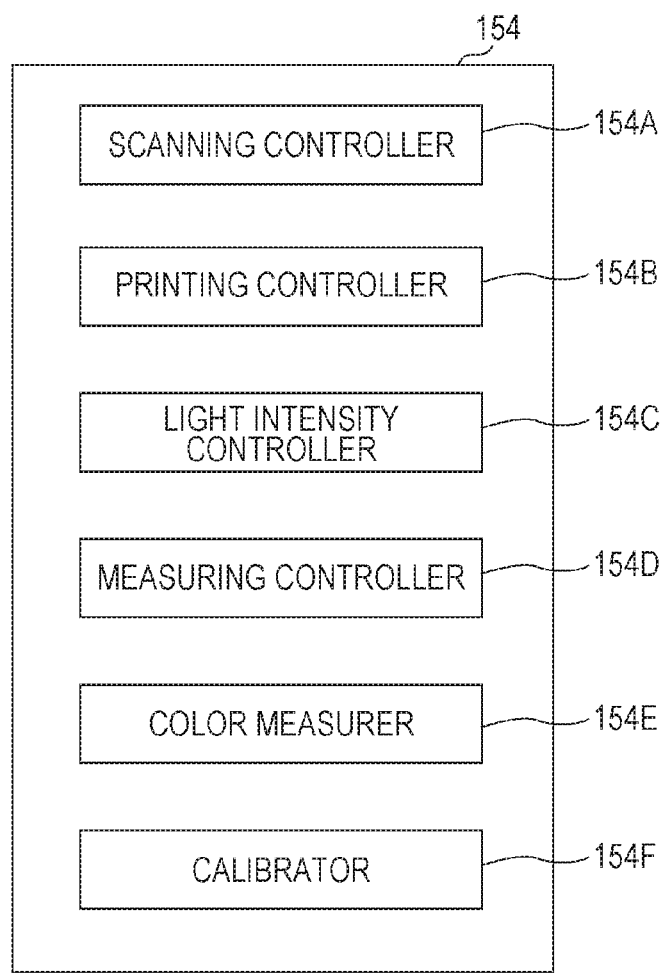
FIG. 5 is a block diagram illustrating each functional configuration of a CPU of the printer in the first embodiment.

FIG. 5 is a block diagram illustrating a functional configuration of the CPU 154 of the control unit 15 of the printer 10.

The CPU 154 operates as a scanning controller 154A, a printing controller 154B, a light intensity controller 154C, a measuring controller 154D, a color measurer 154E, and a calibrator 154F, as illustrated in FIG. 5, by reading and executing various programs stored in the memory 153.

The scanning controller 154A outputs to the unit controller circuit 152 a command signal that indicates driving of the supply unit 11, the transport unit 12, and the carriage moving unit 14. Accordingly, the unit controller circuit 152 drives the roll drive motor of the supply unit 11 and supplies the medium A to the transport unit 12. The unit controller circuit 152 drives the transport motor of the transport unit 12 to transport a predetermined region of the medium A along the Y direction to a position on the platen 122 facing the carriage 13. The unit controller circuit 152 drives the carriage motor 142 of the carriage moving unit 14 to move the carriage 13 along the X direction.

The printing controller 154B outputs a command signal that indicates control of the printing unit 16 to the unit controller circuit 152 based on, for example, the print data that is input from the external apparatus 20. When the command signal is output to the unit controller circuit 152 from the printing controller 154B, the unit controller circuit 152 outputs a printing control signal to the printing unit 16 to drive the piezoelectric element disposed in the nozzle and causes ink to be discharged to the medium A. When printing is performed, an image configured of a plurality of dots is printed on the medium A by alternately repeating a dot forming operation that moves the carriage 13 along the X direction and discharges ink from the printing unit 16 during the moving to form a dot and a transport operation that transports the medium A in the Y direction.

The light intensity controller 154C constitutes a light intensity control unit of the present disclosure. The light intensity controller 154C controls a drive current (or a drive voltage) applied to the light source 171A according to the detection signal, which is indicative of the intensity of extraneous light, from the extraneous light sensor 18 to adjust the intensity of the illumination light emitted from the light source unit 171. The content of processing in the light intensity controller 154C will be described in detail later.

The measuring controller 154D performs a spectrometry process. Specifically, the measuring controller 154D reads a drive voltage for the electrostatic actuator 56 with respect to the wavelength of light transmitted through the wavelength-selective interference filter 5 from the V-λ data of the memory 153 and outputs a command signal to the unit controller circuit 152. Accordingly, the unit controller circuit 152 applies the drive voltage from the command signal to the wavelength-selective interference filter 5, and light of a desired transmitted wavelength is transmitted through the wavelength-selective interference filter 5.

The measuring controller 154D obtains a light reception signal, which is indicative of the intensity of received light, from the light receiver 173 and stores the detection signal in association with the voltage applied to the electrostatic actuator 56 (i.e., the voltage applied to the wavelength-selective interference filter 5 for having the filter transmit the wavelength) in the memory 153.

The color measurer 154E constitutes a reflectance calculator of the present disclosure and corrects the intensity of received light with respect to light of a plurality of wavelengths obtained by spectrometry to calculate a reflectance in each wavelength at the position of measurement R based on the corrected intensity of received light. The color measurer 154E measures the intensity of color at the position of measurement R based on the calculated reflectance.

A reflectance calculating process performed by the color measurer 154E will be described in detail later.

The calibrator 154F corrects (updates) the printing profile data based on a color measurement result from the color measurer 154E.

Spectroscopy Method

Next, a spectroscopy method in the printer 10 of the present embodiment will be described based on the drawings.

Figure 6:
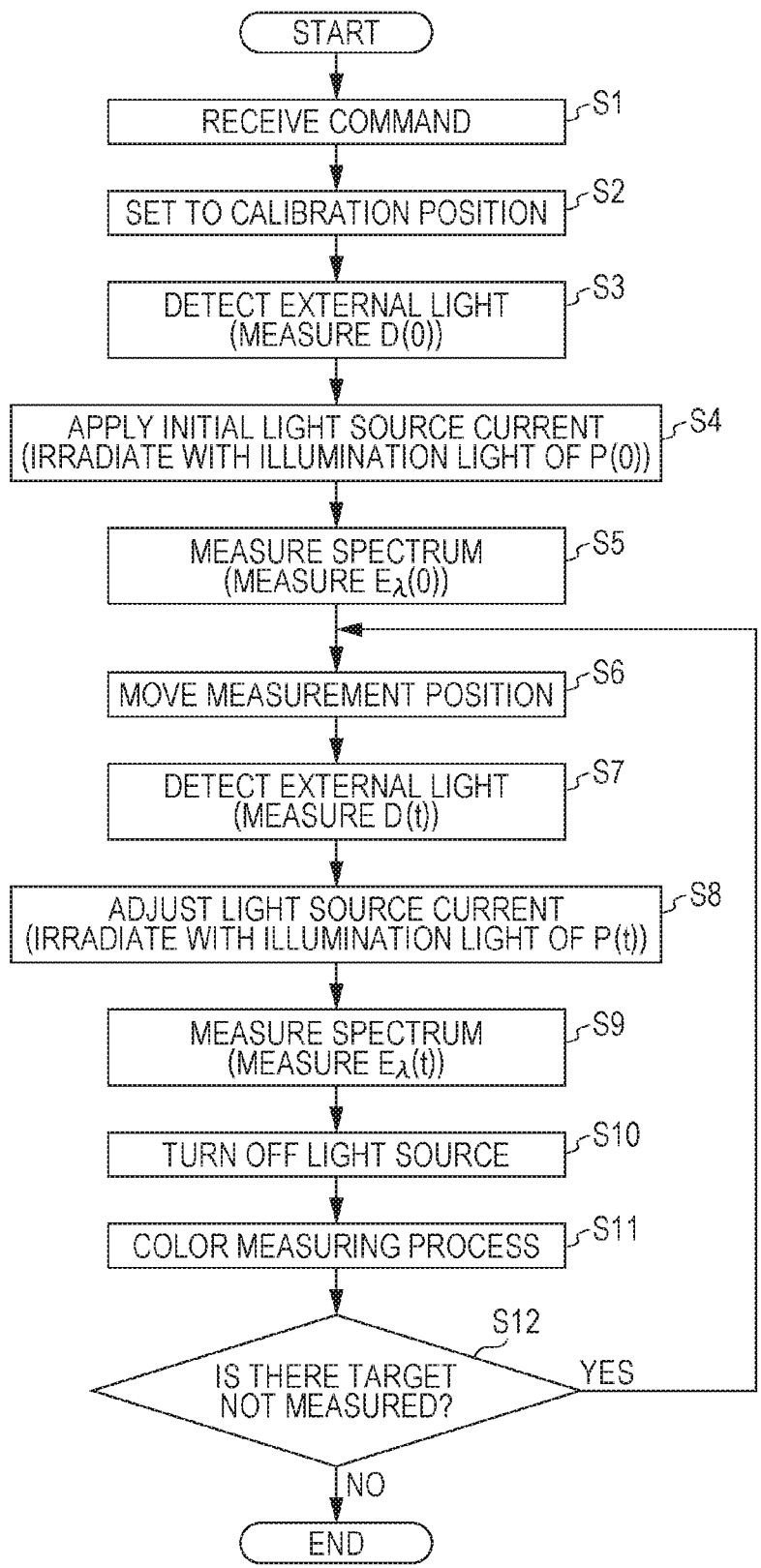
FIG. 6 is a flowchart illustrating a spectrometry method for the printer of the first embodiment.

FIG. 6 is a flowchart illustrating the spectroscopy method in the printer 10.

As a spectrometry process performed by the printer 10, an example in which the spectrometry process is performed on a plurality of color patches printed by the printing unit 16 will be described. That is, each color patch is a measured object of the present disclosure.

In the spectrometry process of the present example, a command that indicates performance of the spectrometry process is received from, for example, user operation or input from the external apparatus 20 (Step S1). When the command is received in Step S1, the scanning controller 154A controls the transport unit 12 and the carriage moving unit 14 to transport the medium A along the Y direction so that the carriage 13 is positioned on a line in which the color patches are arranged and, furthermore, to move the carriage 13 to the position of calibration, such as to the −X side end portion (Step S2).

The position of calibration is a position for performing a calibration data obtaining process, described later, and is a white region in the medium A (white paper) where no color patch is disposed. That is, the white region in the present embodiment corresponds to a calibration reference object of the present disclosure. The calibration reference object is not limited to the white region. For example, a calibration reference object that has a known reflectance in each wavelength may be separately installed. For example, a white reference object having a known reflectance may be disposed at a part of the platen 122, and the white reference object may be used as the calibration reference object of the present disclosure.

The control unit 15 performs the calibration data obtaining process that obtains calibration data to correct a spectrometry result.

In the calibration data obtaining process, the measuring controller 154D obtains the detection signal from the extraneous light sensor 18 (Step S3). The measuring controller 154D stores the signal value of the obtained detection signal as a first extraneous light intensity $D(0)$ in the memory 153. While the signal value of the detection signal is used as the first extraneous light intensity $D(0)$ in the present embodiment, this is not for limitation purposes. For example, since the detection signal output from the extraneous light sensor 18 is proportional to the intensity of extraneous light, the intensity of extraneous light may be measured based on the signal value and stored as the first extraneous light intensity $D(0)$.

Next, the light intensity controller 154C applies a preset initial light source current to the light source 171A causing the light source 171A to emit illumination light corresponding to an initial light source current $I(0)$ (Step S4). That is, the light intensity controller 154C causes the light source 171A to emit a first illumination light intensity $P(0)$ of illumination light corresponding to the initial light source current $I(0)$.

Then, the measuring controller 154D performs the spectrometry process at the position of calibration and measures the intensity of light in, for example, 16 measured wavelength bands in the visible light region from 400 nm to 700 nm at an interval of 20 nm (Step S5: first measuring step).

That is, the measuring controller 154D applies the drive voltage to the electrostatic actuator 56 of the wavelength-selective interference filter 5 based on the V-λ data stored in the memory 153. Accordingly, light, of the reflective light that is reflected from the position of measurement R to the spectroscope 17, having a measured wavelength corresponding to the dimension of the gap between the reflecting films 54 and 55 of the wavelength-selective interference filter 5 is transmitted and is received by the light receiver 173, and the light reception signal corresponding to the intensity of light received is input into the control unit 15.

The measuring controller 154D sequentially changes the drive voltage applied to the electrostatic actuator 56 by referencing the V-λ data to sequentially switch the wavelength of light received by the light receiver 173. Accordingly, the light reception signal can be obtained with respect to, for example, 16 measured wavelength bands. In the present embodiment, the light reception signal with respect to each measured wavelength is stored as a first measured value $E_\lambda(0)$ in the memory 153.

Next, the scanning controller 154A controls the transport unit 12 and the carriage moving unit 14 to move the carriage 13 so that the position of measurement R is positioned on the color patches (Step S6).

Then, the measuring controller 154D detects extraneous light with the extraneous light sensor 18 and obtains the detection signal input from the extraneous light sensor 18 (Step S7). The signal value of the obtained detection signal is stored as a second extraneous light intensity $D(t)$ in the memory 153. When, for example, the intensity of extraneous light is measured based on the detection signal output from the extraneous light sensor 18 as described above, the intensity of extraneous light may be used as the second extraneous light intensity $D(t)$.

Then, the light intensity controller 154C adjusts the intensity of the illumination light from the light source unit 171 in the irradiation of the position of measurement R based on the first extraneous light intensity $D(0)$, the second extraneous light intensity $D(t)$, and the first illumination light intensity $P(0)$ with respect to the initial light source current stored in the memory 153 during measuring of the color patches (Step S8: light intensity controlling step).

In Step S8, the light intensity controller 154C controls the light source 171A such that the ratio of the second extraneous light intensity $D(t)$ and a second illumination light intensity $P(t)$ during spectrometry is equal to a first value, where the first value is the ratio of the first extraneous light intensity $D(0)$ and the first illumination light intensity $P(0)$ in the calibration data obtaining process. Specifically, the light intensity controller 154C calculates the intensity (i.e., second illumination light intensity $P(t)$) of the illumination light emitted from the light source 171A during spectrometry performed on the color patches as illustrated in the following Expression (1). Then, the light intensity controller 154C obtains a light source current $I(t)$ corresponding to the calculated second illumination light intensity $P(t)$ based on the light source control data and applies the light source current $I(t)$ to the light source 171A.

Therefore, if the intensity of extraneous light is increased or decreased, so is the intensity of the illumination increased or decreased, and the light intensity ratio of extraneous light and illumination light is maintained at a constant value (first value) at all times.

$$P(t)=P(0)\times D(t)/D(0) \qquad (1)$$

The measuring controller 154D performs the spectrometry process on the color patches (Step S9: second measuring step). In Step S9, which is similar to Step S5, the measuring controller 154D measures the intensity of light in, for example, 16 measured wavelength bands in the visible light region from 400 nm to 700 nm at an interval of 20 nm.

That is, the measuring controller 154D applies the drive voltage to the electrostatic actuator 56 of the wavelength-selective interference filter 5 based on the V-λ data stored in the memory 153 and obtains the light reception signal output from the light receiver 173. The measuring controller 154D sequentially changes the drive voltage applied to the electrostatic actuator 56 by referencing the V-λ data to sequentially switch the wavelength of light received by the light receiver 173. In the present embodiment, the light reception signal with respect to each measured wavelength obtained in Step S9 is stored as a second measured value $E_\lambda(t)$ in the memory 153.

Then, the measuring controller 154D turns off the light source 171A (Step S10).

Next, the color measurer 154E performs a colorimetry process on the color patches (Step S11: correcting step).

Specifically, the color measurer 154E calculates a reflectance $R_\lambda(t)$ by using the second measured value $E_\lambda(t)$ with respect to each measured wavelength obtained in Step S9, the first measured value $E_\lambda(0)$ obtained in Step S5, the first extraneous light intensity D(0), and the second extraneous light intensity D(t) as illustrated in the following Expression (2).

$$R_\lambda(t) = D(0)E_\lambda(t)/D(t)E_\lambda(0) \qquad (2)$$
$$= P(0)E_\lambda(t)/P(t)E_\lambda(0)$$
$$= I(0)E_\lambda(t)/I(t)E_\lambda(0)$$

While the first extraneous light intensity D(0) and the second extraneous light intensity D(t) are respectively used as a first light intensity value X(0) and a second light intensity value X(t) in the present embodiment, this is not for limitation purposes. That is, since the intensity of the illumination light from the light source 171A is so adjusted that the light intensity ratio of extraneous light and illumination light is constant in the present embodiment, the first illumination light intensity P(0) and the second illumination light intensity P(t) or the initial light source current I(0) and the light source current I(t) of the light source 171A may be respectively used as the first light intensity value X(0) and the second light intensity value X(t) of the present disclosure as illustrated in Expression (2). In addition, the intensity of extraneous light that is calculated based on the detection signal from the extraneous light sensor 18 may be used.

The color measurer 154E further calculates a colorimetric value (e.g., an XYZ value or an L*a*b* value) from the reflectance $R_\lambda(t)$ of each measured wavelength and stores the colorimetric value in the memory 153.

The color measurer 154E may output a calculated spectral reflectance or the colorimetric value to the external apparatus 20 or to a display disposed in the printer 10 for display or may control the printing unit 16 to print the color measurement result.

Then, the measuring controller 154D determines whether there is an unmeasured target (Step S12).

If Step S12 is determined as Yes, the process returns to Step S6, and the scanning controller 154A controls the transport unit 12 and the carriage moving unit 14 to move the position of measurement R in the spectroscope 17 to a subsequent color patch.

The process ends if Step S12 is determined as No. In this case, the calibrator 154F updates the printing profile data stored in the memory 153 based on the color measurement result for each color patch.

Effect of Present Embodiment

The printer 10 of the present embodiment includes the light source 171A, the spectroscope 17 that includes the wavelength-selective interference filter 5, and the extraneous light sensor 18. The CPU 154 of the control unit 15 functions as the light intensity controller 154C, and the light intensity controller 154C controls the light source 171A to emit illumination light so that the ratio of the intensity of extraneous light detected by the extraneous light sensor 18 and the intensity of the illumination light emitted from the light source 171A is equal to the first value (i.e., constant value).

As such, if the second measured value $E_\lambda(t)$ at the time of performing spectrometry on the color patches is corrected based on the light intensity ratio by controlling the light intensity ratio of extraneous light and illumination light such that the light intensity ratio is constant at all times, the spectrometry process and the colorimetry process can be performed with high accuracy by reducing measurement error due to a change in the intensity of extraneous light. In addition, since the calibration data obtaining process is not required to be performed each time the color patches are measured, a high speed spectrometry process can be realized.

In the present embodiment, the light intensity controller 154C adjusts the intensity of illumination light such that the light intensity ratio is equal to the first value during the spectrometry performed on the color patches, where the first value is the light intensity ratio of extraneous light in the calibration data obtaining process and illumination light in the calibration data obtaining process. That is, the second illumination light intensity P(t) is calculated based on Expression (1), and the light source current I(t) corresponding to the second illumination light intensity P(t) is applied to the light source 171A.

Accordingly, as described above, the light intensity ratio of extraneous light and illumination light can be constantly maintained, and, even if the environment around, for example, a location where the printer 10 is installed is changed, light source control can be performed according to the environment.

In the present embodiment, the color measurer 154E calculates the reflectance in each measured wavelength from Expression (2) by using the first measured value $E_\lambda(0)$, the second measured value $E_\lambda(t)$, the first extraneous light intensity D(0), and the second extraneous light intensity D(t).

Even if a change in the intensity of extraneous light occurs as described above, the light source 171A is controlled such that the light intensity ratio of extraneous light and illumination light is constant in the present embodiment. Therefore, the reflectance in each measured wavelength can be easily corrected based on the rate of change of the total light intensity in the irradiation of the position of measurement R D(t)/D(0) (=P(t)/P(0)=I(t)/I(0)) as illustrated in Expression (2).

The present embodiment uses wavelength-selective interference filter 5 that is a wavelength-selective Fabry-Perot etalon element as the spectroscopy element. Such a wavelength-selective interference filter 5 has a low cost and a small size in comparison with a case where other spectroscopy elements such as an AOTF, an LCTF, and a grating are used. Thus, the cost and size of the spectroscope 17 are decreased. Therefore, the wavelength-selective interference filter 5 can be integrally mounted with the printing unit 16 on the carriage 13 of the printer 10, and the configuration of the printer 10 can be simplified.

In the present embodiment, the spectroscope 17 is mounted in the printer 10 that includes the printing unit 16 forming an image on the medium A and performs spectrometry on the medium A. The calibrator 154F updates the printing profile data based on the reflectance in each measured wavelength and the intensity of color calculated from the spectrometry result.

The printer 10 can perform high accuracy spectrometry on the color patches and a high accuracy colorimetry process. Therefore, by updating the printing profile data based on the color measurement result from the colorimetry process, the printing unit 16 can form an image in which the intensity of color desired by a user is reproduced with high accuracy.

In the present embodiment, the extraneous light sensor 18 is disposed on the platen 122 side of the spectroscope casing 175 of the spectroscope 17. Thus, the extraneous light sensor 18 can detect extraneous light that is incident near the medium A (incident between the medium A and the spectroscope 17).

In addition, the optical axis L1 of the extraneous light sensor 18 is approximately parallel to the surface of the medium A (approximately parallel to the XY plane) and is arranged so that extraneous light is incident in a direction on the opposite side of the extraneous light sensor 18 from the position of measurement R. Therefore, the problem that the illumination light from the light source unit 171 is incident on the extraneous light sensor 18 can be prevented, and only extraneous light components can be appropriately detected.

Other Embodiments

The present disclosure is not limited to each embodiment described above. Modifications, improvements, and configurations obtained by an appropriate combination of each embodiment to the extent capable of achieving the advantage of the present disclosure are to be included in the present disclosure.

Modification Example 1

While the light source current I(t) that corresponds to the second illumination light intensity P(t) calculated based on Expression (1) is read from the light source control data and is applied to the light source 171A in the above embodiment, this is not for limitation purposes.

For example, the light source current may be increased in proportion to the detection signal from the extraneous light sensor 18. That is, in the calibration data obtaining process, the first extraneous light intensity D(0) is detected, and the light source 171A is driven with the initial light source current I(0). Then, during measuring of the color patches, when the second extraneous light intensity D(t) is detected, the light source current I(t) applied to the light source 171A is calculated from I(t)=I(0)×D(t)/D(0) to emit illumination light.

In this case, the intensity of illumination light is increased in proportion to the light source current. Thus, performed is substantially the same process as in the above embodiment.

Modification Example 2

In the above embodiment, the extraneous light sensor 18 is arranged at a position in the platen 122 side end portion on the side face of the spectroscope casing 175, where the optical axis of the extraneous light sensor 18 is approximately parallel to the XY plane with no incidence of the illumination light from the light source 171. However, this is not for limitation purposes.

FIGS. 7A and 7B are a schematic sectional view of a spectroscope illustrating other examples of a position at which the extraneous light sensor 18 is arranged.

As illustrated in FIG. 7A, the extraneous light sensor 18 may be disposed on a face of the spectroscope 17 that faces the platen 122. In FIG. 7B, the extraneous light sensor 18 is arranged such that the optical axis L1 may be slanted in a direction away from the position of measurement R in order to prevent incidence of the illumination light from the light source 171. A light blocking unit that prevents incidence of illumination light may be separately arranged on the position of measurement R side of the extraneous light sensor 18.

As such, disposing the extraneous light sensor 18 on the face of the spectroscope 17 facing the platen 122 allows the intensity of extraneous light entering between the spectroscope 17 and the medium A (extraneous light that is incident at the position of measurement R) to be detected more accurately.

Modification Example 3

While the above embodiment illustrates a configuration in which the unit controller circuit 152 is disposed in the control unit 15, a control unit may be disposed in each unit separately from the control unit 15 as above. For example, a filter controller circuit that controls the wavelength-selective interference filter 5 and a light reception controller circuit that controls the light receiver 173 may be disposed in the spectroscope 17. In addition, a microcomputer and a memory that stores the V-λ data may be incorporated into the spectroscope 17, and the microcomputer may function as the light intensity controller 154C and the measuring controller 154D.

Modification Example 4

While the above embodiment illustrates the printing unit 16 as an ink jet type that discharges ink supplied from the ink tank by driving the piezoelectric element, this is not for limitation purposes. For example, the printing unit may discharge ink by generating an air bubble with a heater in the ink or may discharge ink with an ultrasonic vibrator.

This is not limited to an ink jet type and, for example, can be applied to a printer of any printing type, such as a thermal printer using thermal transfer, a laser printer, and a dot impact printer.

Modification Example 5

While the above embodiment illustrates the wavelength-selective interference filter 5 as a light transmitting type that transmits light of a wavelength corresponding to the gap G between the reflecting films 54 and 55 from incident light, this is not for limitation purposes. For example, a light reflecting wavelength-selective interference filter that reflects light of a wavelength corresponding to the gap G between the reflecting films 54 and 55 may be used. In addition, other types of wavelength-selective interference filters may be used.

While the wavelength-selective interference filter 5 is illustrated as a spectroscopy element, this is not for limitation purposes. For example, a grating, an AOTF, or an LCTF may be used as a spectroscopy element.

Modification Example 6

While the above embodiment illustrates the spectroscopy device 172 in which the wavelength-selective interference filter 5 is accommodated in the casing 6, for example, the wavelength-selective interference filter 5 may be directly disposed in the spectroscope 17.

Modification Example 7

While the spectroscopy device 172 that includes the wavelength-selective interference filter 5 is illustrated as being disposed between the light guide 174 and the light receiver 173 (post-dispersive spectroscopy), this is not for limitation purposes.

For example, the wavelength-selective interference filter 5 or the spectroscopy device 172 including the wavelength-selective interference filter 5 may be arranged in the light source unit 171, and the medium A may be irradiated with light on which spectroscopy is performed with the wavelength-selective interference filter 5 (pre-dispersive spectroscopy).

Modification Example 8

While the spectroscope 17 is illustrated by a configuration example in which the medium A is irradiated with light of the light source unit 171 in the direction of the normal line thereof and the light guide 174 causes light reflected by the medium A at 45° to be incident on the wavelength-selective interference filter 5, this is not for limitation purposes.

For example, light may be incident on the surface of the medium A at an angle of 45°, and the light receiver 173 may receive light that is reflected by the medium A in the direction of the normal line thereof through the wavelength-selective interference filter 5.

While the light receiver 173 receives light reflected by the medium A at 45° through the wavelength-selective interference filter 5, the light receiver 173 may receive light that is reflected at an angle other than 45°, such as 30°. That is, the angle of the optical axis of the light receiver 173 and the wavelength-selective interference filter 5 may be so set that the light receiver 173 does not receive light that is reflected by the medium A in a specular manner.

Modification Example 9

While the above embodiment illustrates the printer that includes the spectrometry device, this is not for limitation purposes. For example, the spectrometry device may not include an image forming unit and perform only the colorimetry process on the medium A. The spectrometry device of the present disclosure may be incorporated into, for example, a quality inspecting apparatus that inspects the quality of a printed matter manufactured in a factory or the like, or besides, the spectrometry device of the present disclosure may be incorporated into any apparatus.

Besides, a specific structure in embodying the present disclosure may be configured by appropriately combining the above embodiment and the modification examples to the extent capable of achieving the advantage of the present disclosure and may be appropriately changed to other structures and the like.

The entire disclosure of Japanese Patent Application No. 2015-059382 filed Mar. 23, 2015 is expressly incorporated by reference herein.

What is claimed is:

1. A spectrometry device comprising:
   a spectroscope that includes a light source that emits illumination light to a measurement target, a condenser that condenses light from the light source at the measurement target, a reflecting mirror that reflects light incident from the measurement target onto an optical axis of an interference filter that performs spectroscopy on light incident from the measurement target, and a light receiver that detects an intensity of the light that is transmitted through the interference filter;
   an extraneous light detector that detects an intensity of extraneous light; and
   a light intensity control unit that controls an intensity of the illumination light emitted from the light source such that a light intensity ratio of the illumination light emitted from the light source and the extraneous light detected by the extraneous light detector is equal to a light intensity ratio of an illumination light and an extraneous light determined during a calibration procedure of the spectroscope,
   wherein the light intensity control unit controls the light intensity ratio to be constant at all times by maintaining the light intensity ratio to be equal to the light intensity ratio of the illumination light and the extraneous light determined during the calibration procedure of the spectroscope.

2. The spectrometry device according to claim 1, further comprising:
   a light receiver that detects an intensity of the light that is transmitted through the interference filter; and
   a reflectance calculator that calculates the reflectance of a measured object based on a first measured value, a second measured value, a first light intensity value, and a second light intensity value, wherein:
   the first measured value is determined from light detected by the light receiver when the spectroscope performs spectrometry on a calibration reference object as the measurement target,
   the second measured value is determined from light detected by the light receiver when the spectroscope performs spectrometry on the measured object as the measurement target,
   the first light intensity value is based on the intensity of one of the illumination light emitted from the light source and the extraneous light detected by the extraneous light detector during spectrometry performed on the calibration reference object, and
   the second light intensity value is based on the intensity of the one of the illumination light emitted from the light source and the extraneous light detected by the extraneous light detector during spectrometry performed on the measured object.

3. The spectrometry device according to claim 1, wherein the interference filter is a wavelength-selective Fabry-Pérot etalon element.

4. An image forming apparatus comprising:
   the spectrometry device according to claim 1; and
   an image forming unit that forms an image on an image formation target.

5. An image forming apparatus comprising:
the spectrometry device according to claim 2; and
an image forming unit that forms an image on an image formation target.

6. An image forming apparatus comprising:
the spectrometry device according to claim 3; and
an image forming unit that forms an image on an image formation target.

7. A spectrometry method for a spectrometry device including:
a spectroscope that includes a light source that emits illumination light to a measurement target, a condenser that condenses light from the light source at the measurement target, a reflecting mirror that reflects light incident from the measurement target onto an optical axis of an interference filter that performs spectroscopy on incident light from the measurement target, and a light receiver that detects an intensity of the light that is transmitted through the interference filter, and
an extraneous light detector that detects an intensity of extraneous light which is incident on the measurement target, the method comprising:
controlling, by a light intensity control unit, an intensity of the illumination light emitted from the light source such that a light intensity ratio of the illumination light emitted from the light source and the extraneous light detected by the extraneous light detector is equal to a first value; and
controlling, by the light intensity control unit, the light intensity ratio to be constant at all times by maintaining the light intensity ratio to be equal to the light intensity ratio of the illumination light and the extraneous light determined during the calibration procedure of the spectroscope.

8. The spectrometry method according to claim 7, further comprising:
performing, as a first measuring by the spectroscope, spectrometry on a calibration reference object as the measurement target by using the spectroscope and obtaining a first measured value from a light detected by a light receiver;
performing, as a second measuring by the spectroscope, spectrometry on a measured object as the measurement target and obtaining a second measured value from a light detected by the light receiver;
correcting the second measured value based on a first light intensity value, a second light intensity value, and the first measured value, wherein the first light intensity value is based on the intensity of one of the extraneous light detected by an extraneous light detector and the illumination light emitted from the light source in the first measuring, and the second light intensity value is based on the intensity of the one of the extraneous light detected by the extraneous light detector and the illumination light emitted from the light source in the second measuring; and
controlling the light intensity based on the first measured value and the second measured value.

9. A spectrometry device comprising:
a spectroscope that includes a light source that emits illumination light to a measurement target and an interference filter that performs spectroscopy on light incident from the measurement target;
an extraneous light detector that detects an intensity of extraneous light;
a light intensity control unit that controls an intensity of the illumination light emitted from the light source such that a light intensity ratio of the illumination light emitted from the light source and the extraneous light detected by the extraneous light detector is equal to a light intensity ratio of an illumination light and an extraneous light determined during a calibration procedure of the spectroscope,
wherein the light intensity control unit controls the light intensity ratio to be constant at all times by maintaining the light intensity ratio to be equal to the light intensity ratio of the illumination light and the extraneous light determined during the calibration procedure of the spectroscope;
a light receiver that detects an intensity of the light that is transmitted through the interference filter; and
a reflectance calculator that calculates the reflectance of a measured object based on a first measured value, a second measured value, a first light intensity value, and a second light intensity value, wherein
the first measured value is determined from light detected by the light receiver when the spectroscope performs spectrometry on a calibration reference object as the measurement target,
the second measured value is determined from light detected by the light receiver when the spectroscope performs spectrometry on the measured object as the measurement target,
the first light intensity value is based on the intensity of one of the illumination light emitted from the light source and the extraneous light detected by the extraneous light detector during spectrometry performed on the calibration reference object, and
the second light intensity value is based on the intensity of the one of the illumination light emitted from the light source and the extraneous light detected by the extraneous light detector during spectrometry performed on the measured object.

* * * * *